(12) United States Patent
Perski et al.

(10) Patent No.: US 8,666,115 B2
(45) Date of Patent: Mar. 4, 2014

(54) COMPUTER VISION GESTURE BASED CONTROL OF A DEVICE

(75) Inventors: Haim Perski, Hod-HaSharon (IL); Amir Kaplan, Hod-HaSharon (IL); Eran Eilat, Givatayim (IL)

(73) Assignee: Pointgrab Ltd., Hod Hasharon (IL)

( * ) Notice: Subject to any disclaimer, the term of this patent is extended or adjusted under 35 U.S.C. 154(b) by 0 days.

(21) Appl. No.: 13/499,929

(22) PCT Filed: Oct. 13, 2010

(86) PCT No.: PCT/IL2010/000837
§ 371 (c)(1),
(2), (4) Date: Apr. 3, 2012

(87) PCT Pub. No.: WO2011/045789
PCT Pub. Date: Apr. 21, 2011

(65) Prior Publication Data
US 2012/0200494 A1    Aug. 9, 2012

Related U.S. Application Data

(60) Provisional application No. 61/250,953, filed on Oct. 13, 2009, provisional application No. 61/315,025, filed on Mar. 18, 2010.

(30) Foreign Application Priority Data

Jul. 7, 2010   (GB) .................................. 1011457.7

(51) Int. Cl.
*G06K 9/00*   (2006.01)
*G06K 9/78*   (2006.01)

(52) U.S. Cl.
USPC ............................ 382/103; 382/181; 382/218

(58) Field of Classification Search
USPC ........................................ 382/103, 181, 218
See application file for complete search history.

(56) References Cited

U.S. PATENT DOCUMENTS

| | | |
|---|---|---|
| 5,594,469 A | 1/1997 | Freeman et al. |
| 6,002,808 A | 12/1999 | Freeman |
| 6,147,678 A | 11/2000 | Kumar et al. |

(Continued)

FOREIGN PATENT DOCUMENTS

| | | |
|---|---|---|
| EP | 0823683 | 2/1998 |
| TW | 466438 | 12/2001 |

(Continued)

OTHER PUBLICATIONS

Rumpf, et al. "A Nonlinear Elastic Shape Averaging Approach." SIAM Journal on Imaging Sciences. 2.3 (2009): 800-833. Print.*

(Continued)

*Primary Examiner* — Michael A Newman
(74) *Attorney, Agent, or Firm* — Pearl Cohen Zedek Latzer, LLP

(57) ABSTRACT

A system and method are provided for controlling a device based on computer vision. Embodiments of the system and method of the invention are based on receiving a sequence of images of a field of view; detecting movement of at least one object in the images; applying a shape recognition algorithm on the at least one moving object; confirming that the object is a user hand by combining information from at least two images of the object; and tracking the object to control the device.

19 Claims, 12 Drawing Sheets

(56) References Cited

U.S. PATENT DOCUMENTS

| | | |
|---|---|---|
| 6,191,773 B1 | 2/2001 | Maruno et al. |
| 6,236,736 B1 | 5/2001 | Crabtree et al. |
| 6,598,245 B2 | 7/2003 | Nishioka |
| 6,771,294 B1 | 8/2004 | Pulli et al. |
| 6,788,809 B1 | 9/2004 | Grzeszczuk et al. |
| 6,819,782 B1* | 11/2004 | Imagawa et al. .............. 382/115 |
| 6,996,460 B1 | 2/2006 | Krahnstoever et al. |
| 7,274,803 B1 | 9/2007 | Sharma et al. |
| 7,483,049 B2 | 1/2009 | Aman et al. |
| 7,606,411 B2 | 10/2009 | Venetsky et al. |
| 7,620,316 B2 | 11/2009 | Boillot |
| 7,849,421 B2 | 12/2010 | Yoo et al. |
| 7,949,487 B2 | 5/2011 | Sugihara et al. |
| 8,004,492 B2 | 8/2011 | Kramer et al. |
| 8,146,020 B2 | 3/2012 | Clarkson |
| 8,149,210 B2 | 4/2012 | Klier et al. |
| 8,358,855 B2 | 1/2013 | Hamza et al. |
| 8,433,138 B2* | 4/2013 | Wang et al. .................... 382/181 |
| 2002/0057383 A1 | 5/2002 | Iwamura |
| 2002/0075334 A1 | 6/2002 | Yfantis |
| 2003/0128871 A1 | 7/2003 | Naske et al. |
| 2003/0138130 A1* | 7/2003 | Cohen et al. ................... 382/103 |
| 2003/0146935 A1 | 8/2003 | Adleman |
| 2003/0156756 A1 | 8/2003 | Gokturk et al. |
| 2004/0101192 A1 | 5/2004 | Yokoyama |
| 2005/0025345 A1 | 2/2005 | Ohta et al. |
| 2005/0064936 A1 | 3/2005 | Pryor |
| 2005/0104850 A1 | 5/2005 | Hu et al. |
| 2005/0271279 A1 | 12/2005 | Fujimura et al. |
| 2006/0033701 A1 | 2/2006 | Wilson |
| 2006/0132432 A1 | 6/2006 | Bell |
| 2006/0188849 A1 | 8/2006 | Shamaie |
| 2006/0209021 A1 | 9/2006 | Yoo et al. |
| 2006/0238520 A1 | 10/2006 | Westerman et al. |
| 2006/0245618 A1* | 11/2006 | Boregowda et al. .......... 382/107 |
| 2007/0057781 A1 | 3/2007 | Breed |
| 2007/0077987 A1 | 4/2007 | Gururajan et al. |
| 2007/0092134 A1 | 4/2007 | Fukui et al. |
| 2007/0113207 A1 | 5/2007 | Gritton |
| 2007/0118820 A1 | 5/2007 | Hatakeyama |
| 2007/0298882 A1 | 12/2007 | Marks et al. |
| 2008/0036732 A1 | 2/2008 | Wilson et al. |
| 2008/0065291 A1 | 3/2008 | Breed |
| 2008/0126937 A1 | 5/2008 | Pachet |
| 2008/0141181 A1 | 6/2008 | Ishigaki et al. |
| 2008/0166022 A1 | 7/2008 | Hildreth |
| 2008/0205701 A1 | 8/2008 | Shamaie et al. |
| 2008/0244468 A1 | 10/2008 | Nishihara et al. |
| 2008/0273755 A1 | 11/2008 | Hildreth |
| 2009/0060293 A1 | 3/2009 | Nagao et al. |
| 2009/0079813 A1 | 3/2009 | Hildreth |
| 2009/0096871 A1 | 4/2009 | Kuwano et al. |
| 2009/0141940 A1 | 6/2009 | Zhao et al. |
| 2009/0217211 A1 | 8/2009 | Hildreth et al. |
| 2009/0254855 A1 | 10/2009 | Kretz et al. |
| 2009/0315740 A1 | 12/2009 | Hildreth et al. |
| 2010/0014758 A1 | 1/2010 | Yano et al. |
| 2010/0039378 A1 | 2/2010 | Yabe |
| 2010/0050133 A1 | 2/2010 | Nishihara et al. |
| 2010/0066667 A1 | 3/2010 | MacDougall et al. |
| 2010/0104134 A1 | 4/2010 | Wang et al. |
| 2010/0159981 A1 | 6/2010 | Chiang et al. |
| 2010/0199232 A1 | 8/2010 | Mistry et al. |
| 2010/0281440 A1 | 11/2010 | Underkoffler et al. |
| 2010/0295781 A1 | 11/2010 | Alameh et al. |
| 2010/0315414 A1 | 12/2010 | Lowe |
| 2010/0321293 A1 | 12/2010 | Hsiung |
| 2011/0001840 A1 | 1/2011 | Ishii et al. |
| 2011/0025601 A1 | 2/2011 | Wilson et al. |
| 2011/0026765 A1 | 2/2011 | Ivanich et al. |
| 2011/0102570 A1 | 5/2011 | Wilf et al. |
| 2011/0107216 A1 | 5/2011 | Bi |
| 2011/0154266 A1 | 6/2011 | Friend et al. |
| 2011/0268365 A1 | 11/2011 | Lou et al. |
| 2011/0280441 A1 | 11/2011 | Chen et al. |
| 2011/0304632 A1 | 12/2011 | Evertt et al. |
| 2012/0032152 A1 | 2/2012 | Kim et al. |
| 2012/0062729 A1 | 3/2012 | Hart et al. |
| 2012/0087543 A1 | 4/2012 | Choi et al. |
| 2012/0114173 A1 | 5/2012 | Ikenoue |

FOREIGN PATENT DOCUMENTS

| | | |
|---|---|---|
| WO | WO 2005/114556 | 12/2005 |
| WO | WO 2007/097548 | 8/2007 |
| WO | WO 2008/018943 | 2/2008 |
| WO | WO 2008/038096 | 4/2008 |
| WO | WO 2009/055148 | 4/2009 |
| WO | WO 2009/128064 | 10/2009 |
| WO | WO 2010/144050 | 12/2010 |
| WO | WO 2011/045789 | 4/2011 |
| WO | WO 2011/056731 | 5/2011 |
| WO | WO 2012/020410 | 2/2012 |

OTHER PUBLICATIONS

International Search Report of Application No. PCT/IL10/00837 mailed on Feb. 11, 2011.

Spruyt et al, Real-time multi-colourspace hand segmentation, Proceedings of 2010 IEEE 17th International conference on image processing, pp. 3117-3120, Sep. 26-29, 2012.

Irie et al, Skin color registration using recognition of waving hand, Journal of Robotics and Mechatronics, vol. 22, No. 3, 2010, pp. 262-272, Feb. 1, 2010.

Xiong et al, Extraction of hand gestures with adaptive skin color models and its applications to meeting analysis, Proceedings of the Eighth IEEE International symposium on multimedia, pp. 647-651, Dec. 1, 2006.

Greg, Skeleton tracking with kinect and processing, http://urbanhonking.com/ideasfordozens/2011/02/16/skeleton-tracking-with-kinect-and-processing>, Feb. 16, 2011.

Umouse, http://www.larryo.org/work/information/umouse/index.html Mar. 23, 2009, downloaded for this information disclosure statement May 23, 2013.

Gerg, An Introduction and Overview of a Gesture Recognition System Implelmented for Human Computer Interaction, A thesis submitted in partial fulfillment of the requirements for a baccalaureate degree in Computer Engineering www.gergltd.com/thesis.pdf, Summer 2004.

Freeman et al, Television Control by Hand Gestures, Mitsubishi Electric Research Laboratories, www.merl.com/papers/docs/TR94-24.pdf, Dec. 1994.

Manresa et al, Real—Time Hand Tracking and Gesture Recognition for Human-Computer Interaction, Electronic Letters on Computer Vision and Image Analysis 0(0):1-7, 2000; www.dmi.uib.es/~ugiv/papers/ELCVIAManresa.pdf.

FTK Technologies Ltd.—Company Profile www.matimop.org.il/newrding/company/c608.htm™general, Mar. 23, 2009.

Office action for Israeli application No. 224001, dated Jun. 26, 2013.

US Office action mailed on Aug. 26, 2013 for U.S. Appl. No. 12/937,676.

US Office action mailed on Sep. 10, 2013 for U.S. Appl. No. 13/932,112.

US Office action mailed on Sep. 6, 2013 for U.S. Appl. No. 13/932,137.

International search report report mailed on Sep. 27, 2013 for international application No. PCT/IL2013/050396.

Argyros et al., Vision-Based Interpretation of Hand Gestures for Remote Control of a Computer Mouse, T.S. Huang et al. (Eds.): HCI/ECCV 2006, LNCS 3979, pp. 39-50, 2006.

Suk et al., Dynamic Bayesian Network based Two-Hand Gesture Recognition, Journal of Korean Institute of Information Scientists and Engineers (KIISE): Software and Applications, vol. 35, No. 4, pp. 265-279, 2008.

(56) References Cited

OTHER PUBLICATIONS

International search report report mailed on Oct. 11, 2013 for international application No. PCT/IL2013/050426.
Argyros et al., Binocular Hand Tracking and Reconstruction Based on 2D Shape Matching, ICPR 1, p. 207-210. IEEE Computer Society, (2006).
Nickel et al., Pointing Gesture Recognition based on 3D-Tracking of Face, Hands and Head Orientation, In Proceedings of the $5^{th}$ international conference on Multimodal interfaces, pp. 140-146. AMC, Nov. 5, 2003.
Kolarić et al., Direct 3D Manipulation Using Vision—Based on Recognition of Uninstrumented Hands, X Symposium of Virtual and Augmented Reality, pp. 212-220, 2008.

* cited by examiner

COMPUTER VISION GESTURE BASED CONTROL OF A DEVICE

CROSS-REFERENCE TO RELATED APPLICATIONS

This application is a National Phase Application of PCT International Application No. PCT/IL2010/000837, International Filing Date Oct. 13, 2010, entitled "Computer Vision Gesture Based Control Of A Device", published on Apr. 21, 2011 as International Publication Number WO 2011/045789, claiming priority of U.S. Provisional Patent Application No. 61/250,953, filed Oct. 13, 2009, U.S. Provisional Patent Application No. 61/315,025, filed Mar. 18, 2010 and GB Patent Application No. 1011457.7, filed Jul. 7, 2010, which are all incorporated herein by reference in their entirety.

FIELD OF THE INVENTION

The present invention relates to the field of gesture based control of electronic devices. Specifically, the invention relates to computer vision based hand gesture recognition.

BACKGROUND OF THE INVENTION

The need for more convenient, intuitive and portable input devices increases, as computers and other electronic devices become more prevalent in our everyday life. A pointing device is one type of input device that is commonly used for interaction with computers and other electronic devices that are associated with electronic displays. Known pointing devices and machine controlling mechanisms include an electronic mouse, a trackball, a pointing stick and touchpad, a touch screen and others. Known pointing devices are used to control a location and/or movement of a cursor displayed on the associated electronic display. Pointing devices may also convey commands, e.g. location specific commands, by activating switches on the pointing device.

In some instances there is a need to control electronic devices from a distance, in which case the user cannot touch the device. Some examples of these instances are watching TV, watching video on a PC, etc. One solution used in these cases is a remote control device. Recently, human gesturing, such as hand gesturing, has been suggested as a user interface input tool, which can be used even at a distance from the controlled device. Typically, a hand gesture is detected by a camera and is translated into a specific command.

In the field of computer vision based control, separating the hand from the background, for example, from other moving objects in the background, is a yet unanswered challenge.

SUMMARY OF THE INVENTION

According to a first aspect of the invention there is provided a method for computer vision based hand gesture device control, the method comprising
receiving a sequence of images of a field of view, said images comprising at least one object;
detecting movement of the at least one object in the images, to define at least one moving object;
applying a shape recognition algorithm on the at least one moving object;
confirming that the object is a user hand by combining information from at least two images of the object; and
tracking the confirmed object to control the device.

Combining information from at least two images of the object enables the identification of a user hand even if a hand shape is undetectable or is not easily confirmed (for example in the case of poor environment conditions; poor lighting, background color, background movement, etc.).

Preferably, the method further comprises tracking the confirmed object to identify at least one control gesture.

Further preferably the method comprises confirming that the object has a shape of a hand by combining information from at least two images of the object.

Preferably the combined information comprises a shape affinity grade associated with said object in each image.

Preferably the combined information is a function of at least two shape affinity grades from at least two images.

Advantageously, combining information from at least two images of the object comprises calculating an average of the shape affinity grades from at least two images. Averaging shape affinity grades helps to obtain smoother, cleaner shape detection.

Preferably the method further comprises comparing the average to a predetermined threshold and confirming the object is a user hand if the average is above the threshold.

Further preferably, confirming that the object is a user hand comprises determining that the movement of the object is a movement in a predefined pattern.

Yet further preferably the method comprises determining a shape recognition threshold; and if the movement of the object is a movement in a predefined pattern then lowering the shape recognition threshold, such that the longer the movement is in a predefined pattern, the lower the shape recognition threshold is.

Preferably, the movement in a predefined pattern is a hand gesture.

Preferably, the gesture is a wave-like movement of the hand.

Further preferably the movement in predefined pattern is an initializing gesture and the initializing gesture and the at least one control gesture are not the same.

Preferably, the at least one control gesture is to switch a system to cursor control mode.

Preferably, combining information from at least two images of the object provides a combined image and wherein the shape recognition algorithm is applied on the combined image.

Preferably, combining information from at least two images comprises subtracting one image from another to obtain a subtraction image.

Preferably the method further comprises
applying a contour detection algorithm on the subtraction image;
applying the shape recognition algorithm on the detected contour; and
comparing the contour to a model of a hand contour.

Preferably the method further comprises confirming the object is a hand only if it is a hand with extended fingers.

Preferably, the method further comprises
receiving images of a field of view;
tracking the movement of more than one object in the images; and
comparing the movement of at least one of the objects to a predefined movement pattern; and
if at least one object is moving in a predefined movement pattern, applying shape recognition algorithms to confirm a shape of a hand.

Preferably, tracking comprises selecting points of interest within one image in the sequence of images, detecting the location of the point in another image and identifying points with similar movement and location parameters.

Further preferably, the method comprises applying an edge detection algorithm to confirm the object is a user hand.

Yet further preferably, the method comprises deriving 3D information from the received sequence of images and combining the 3D information with the information combined from at least two images.

According to a second aspect of the invention there is provided a system for user-device interaction, the system comprising:

an electronic device, an image sensor and a processor, the processor to:

receive a sequence of images of a field of view;

detect movement of at least one object in the images;

apply a shape recognition algorithm on the at least one moving object;

combine information from at least two images of the object to confirm that the object is a user hand; and track the object to control the device.

Preferably, the processor is to track the object to identify at least one control gesture and to generate a command to the device based on the at least one control gesture.

Additionally preferably, the image sensor is a 3D image sensor.

Also preferably, the system comprises one or more 2D image sensors. The use of 2D image sensors may be advantageous since 2D image sensors are typically already available in many platforms such as mobile PCs, mobile phones, etc. No special, dedicated hardware (e.g., 3D camera) is necessary.

BRIEF DESCRIPTION OF THE FIGURES

The invention will now be described in relation to certain examples and preferred embodiments with reference to the following illustrative figures so that it may be more fully understood. In the drawings.

DETAILED DESCRIPTION OF THE INVENTION

According to an embodiment of the invention a system for user-device interaction is provided which includes a device and an image sensor which is in communication with a processor. The image sensor obtains image data and sends it to the processor to perform image analysis and to generate user commands to the device based on the image analysis, thereby controlling the device based on computer vision.

According to embodiments of the invention the user commands are based on identification and tracking of a user's hand. According to some embodiments a user hand is identified based on shape recognition of a hand shape, however, according to some embodiments, for example, in conditions in which shape recognition is difficult (e.g., in poor lighting conditions) a user hand may be identified based mainly on movement detection. In all cases, the detection of a user's hand is confirmed based on information obtained from combining two (or more) images.

Figure 1A:
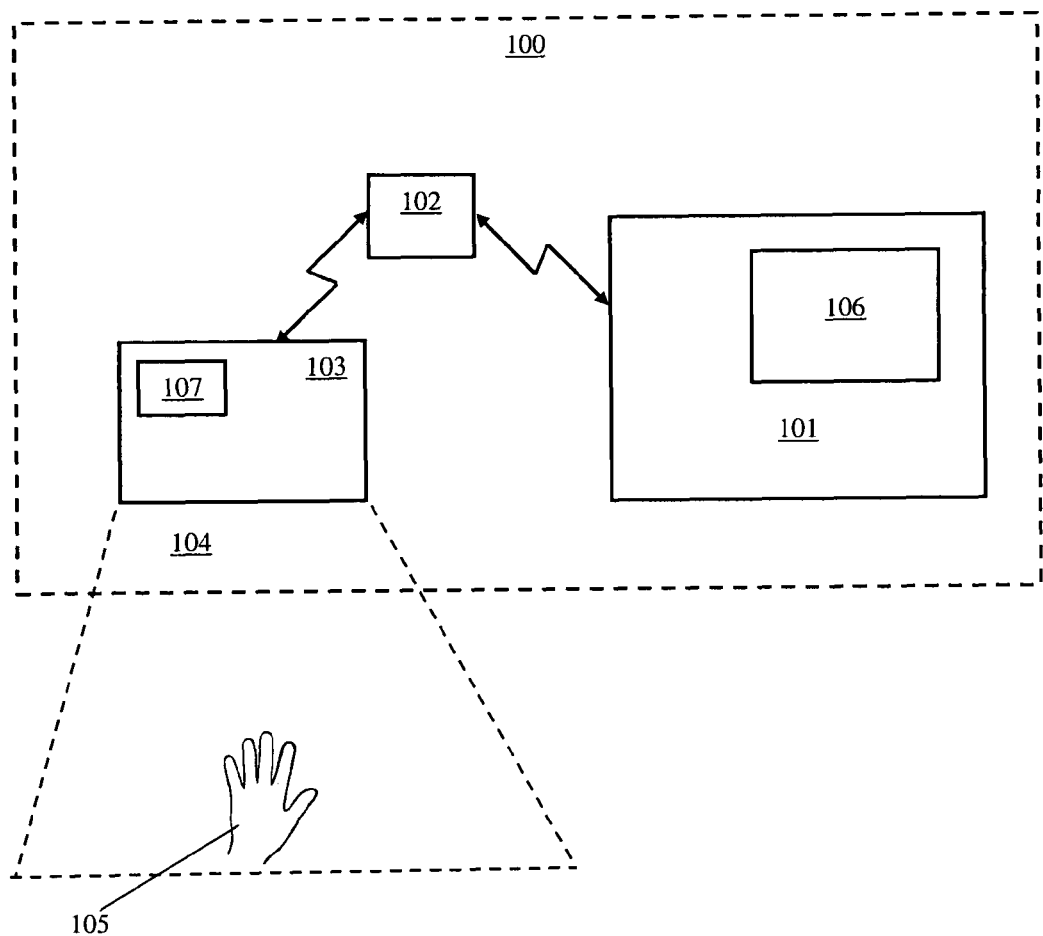
FIG. 1A schematically illustrates a system operable according to embodiments of the invention.

Reference is now made to FIG. 1A which schematically illustrates system 100 according to an embodiment of the invention. System 100 includes an image sensor 103 for obtaining a sequence of images of a field of view (FOV) 104. Image sensor 103 is typically associated with processor 102, and storage device 107 for storing image data. Storage device 107 may be integrated within image sensor 103 or may be external to image sensor 103. According to some embodiments image data may be stored in processor 102, for example in a cache memory.

Image data of field of view (FOV) 104 is sent to processor 102 for analysis. A user command is generated by processor 102, based on the image analysis, and is sent to device 101. According to some embodiments the image processing is performed by a first processor which then sends a signal to a second processor in which a user command is generated based on the signal from the first processor.

Device 101 may be any electronic device that can accept user commands, e.g., TV, DVD player, PC, mobile phone, camera, STB (Set Top Box), streamer, etc. According to one embodiment, device 101 is an electronic device available with an integrated standard 2D camera. According to other embodiments a camera is an external accessory to the device. According to some embodiments more than one 2D camera are provided to enable obtaining 3D information. According to some embodiments the system includes a 3D camera.

Processor 102 may be integral to image sensor 103 or may be a separate unit. Alternatively, the processor 102 may be integrated within the device 101. According to other embodiments a first processor may be integrated within image sensor 103 and a second processor may be integrated within device 101.

The communication between image sensor 103 and processor 102 and/or between processor 102 and device 101 may be through a wired or wireless link, such as through IR communication, radio transmission, Bluetooth technology and other suitable communication routes.

According to one embodiment image sensor 103 is a forward facing camera. Image sensor 103 may be a standard 2D camera such as a webcam or other standard video capture device, typically installed on PCs or other electronic devices. According to some embodiments, image sensor 103 can be IR sensitive.

Image sensor 103 may obtain frames at varying frame rates. According to embodiments of the invention image sensor 103 obtains image data of an object, e.g., a user's hand 105 when the object enters the field of view 104. Typically, the field of view 104 includes hand 105 and a background, such as a wall of a room in which the device and user are located, the user's shirt (for example, if the user is holding his hand up against his body), a computer keypad (for example, if the image sensor field of view is downward facing viewing a PC keypad), etc. The background may include moving parts (such as people other than the user walking through FOV 104, a window curtain being moved by a breeze, etc.).

Processor 102 can apply image analysis algorithms, such as motion detection and shape recognition algorithms to identify and further track the object, typically, the user's hand. Sometimes, a movement, preferably a specific predefined gesture of a user's hand or hands, must be identified within a varying and sometimes moving environment.

Optionally, system 100 may include an electronic display 106. According to embodiments of the invention, mouse emulation and/or control of a cursor on a display, are based on computer visual identification and tracking of a user's hand, for example, as detailed below. Additionally, display 106 may be used to indicate to the user the position of the user's hand within the field of view.

According to some embodiments of the present invention, processor 102 is operative to enhance user hand gesture recognition.

A gesture, according to one embodiment, is a hand movement not directly associated with the resulting user command. For example, a repetitive movement of the hand (e.g., wave like movement) may be a gesture.

System 100 may be operable according to methods, some embodiments of which are described below.

Figure 1B:
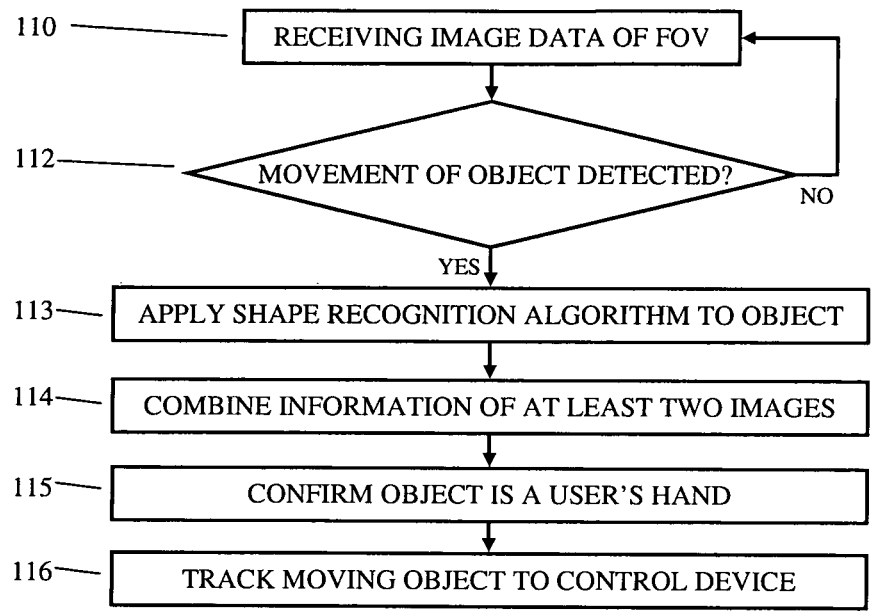
FIG. 1B schematically illustrates a generalized method for device control, according to an embodiment of the invention.

Reference is now made to FIG. 1B which is a flow diagram schematically illustrating a generalized method for device control, according to an embodiment of the invention.

Image data of the field of view is received (110) and analyzed, for example, by processor 102 or by two or more separate processors, to detect movement (112). If movement of an object is detected system 100 applies shape recognition algorithms (113). Shape recognition algorithms may be applied together with or even before movement detection. For example, with or without confirmation of a hand shape a pre-determined movement pattern (e.g., a gesture) may be searched and if a pre-determined movement pattern is detected for an object, the system may lower the threshold for determining that the object is a user hand. The step of applying a shape recognition algorithm on the object in an image may include or may be followed by a step of assigning a grade to the object in each of two or more images. The grade may indicate the affinity the object has to a model of a hand (typically a model having a shape of a hand). A shape affinity grade may indicate probability of similarity to a model of a hand. Information is combined from two (or more) images (114). For example, a combination of movement information and shape information or a combination of shape information (for example the assigned affinity grades) from several images may assist in confirming that a detected object is a user hand. The object is confirmed to be a user hand based on the combined information (115). After the identification of a user hand by the system, the object (according to one embodiment, only an object which displayed movement in a pre-determined pattern) is tracked to further control the device 101, e.g., by detecting control gestures (116).

Figure 1C:
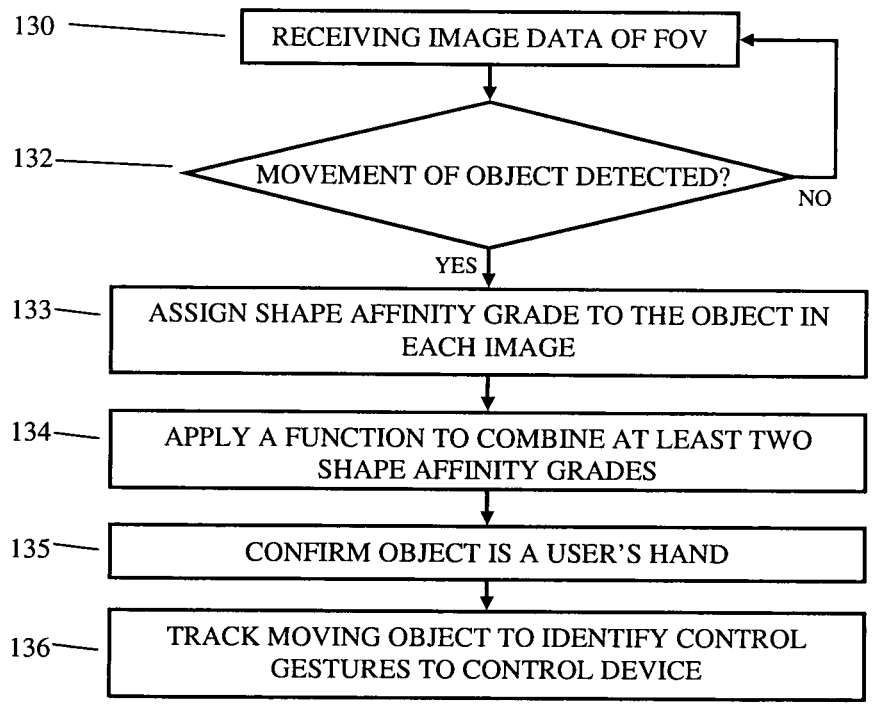
FIG. 1C schematically illustrates a method for device control, according to one embodiment of the invention.

Reference is now made to FIG. 1C which is a flow diagram schematically illustrating a method for device control, according to one embodiment of the invention.

Image data of field of view 104 is received (130) and analyzed, for example, by processor 102 or by two or more separate processors, to detect movement (132). If movement of an object is detected system 100 assigns a shape affinity grade to the object in each image (133). A function (e.g., averaging, subtracting etc.) is applied to combine at least two shape affinity grades (134). The object is confirmed to be a user hand based on the combined information (135). After the identification of a user hand by the system, the object (according to one embodiment, only an object which displayed movement in a pre-determined pattern) is tracked to further detect control gestures and to control device 101 based on the control gestures (136).

Figure 1D:
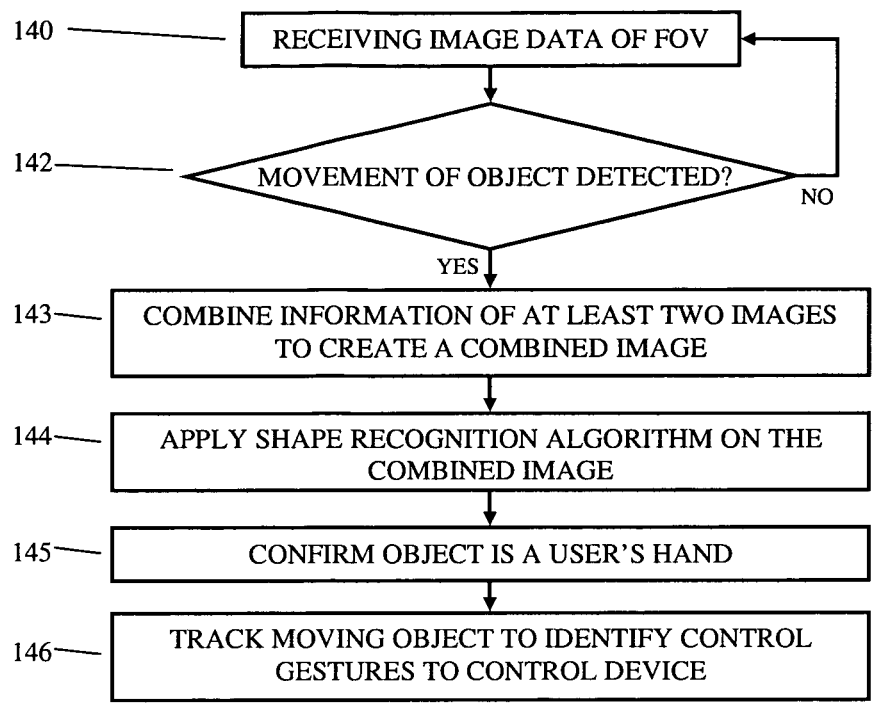
FIG. 1D schematically illustrates a method for device control, according to another embodiment of the invention.

Reference is now made to FIG. 1D which is a flow diagram schematically illustrating a method for device control, according to another embodiment of the invention.

Image data of the field of view is received (140) and analyzed, for example, by processor 102 or by two or more separate processors, to detect movement (142). If movement of an object is detected the system combines information of at least two images to create a combined image (143). A shape recognition algorithm is applied to the combined image (144). For example, two images can be subtracted and detection of a contour can be applied on the subtraction image. The detected contour may then be compared to a model of a hand contour shape in order to confirm the object is a hand. In another example more than one shape recognition algorithm is applied, e.g., both shape detection and contour detection algorithms are applied substantially simultaneously on the subtraction image.

The object is confirmed to be a user hand based on the combined information (145). After the identification of a user hand by the system, the object (according to one embodiment, only an object which displayed movement in a pre-determined pattern) is tracked to further detect control gestures and to control the device 101 based on the control gestures (146).

The image data received is typically a sequence of image frames, e.g. an image stream, and movement may be detected by comparing sequential frames in the image stream.

A system according to some embodiments of the invention operates in a first stage and a second stage; the first stage to detect, based on the image analysis, an initializing or initialization gesture of the user hand and when the initializing gesture is identified, switching to the second stage, the second stage to detect a hand movement, based on the image analysis, and to control the device based on the hand movement. According to one embodiment the initializing gesture and the hand movement are not the same.

According to one embodiment, the system uses a first initializing gesture in the first stage to switch to the second stage having a first set of controls and a second initializing gesture in the first stage to switch to the second stage having a second (and typically different) set of controls to achieve a new functionality of the device (e.g., a first set of controls to control a media player mode and a second set of control to operate an application such as Power-point™).

The initializing gesture may be a repetitive movement of the hand, such as a wave-like movement or a clockwise or counter clockwise circular movement of the user's hand. According to one embodiment the initializing gesture is a gesture in which the hand is positioned on a surface parallel to the sensor and the gesture comprises movement of a user's hand with fingers extended.

The hand movement to control the device (second stage) may be an operating gesture to generate a command to the device or a hand movement to control cursor movement. The operating gesture may include a linear movement of the hand in a pre-defined direction or a movement of the user's hand towards and away from the image sensor or a clockwise or counter clockwise circular movement of the user's hand. Other gestures and movements may be used.

Figure 2A:
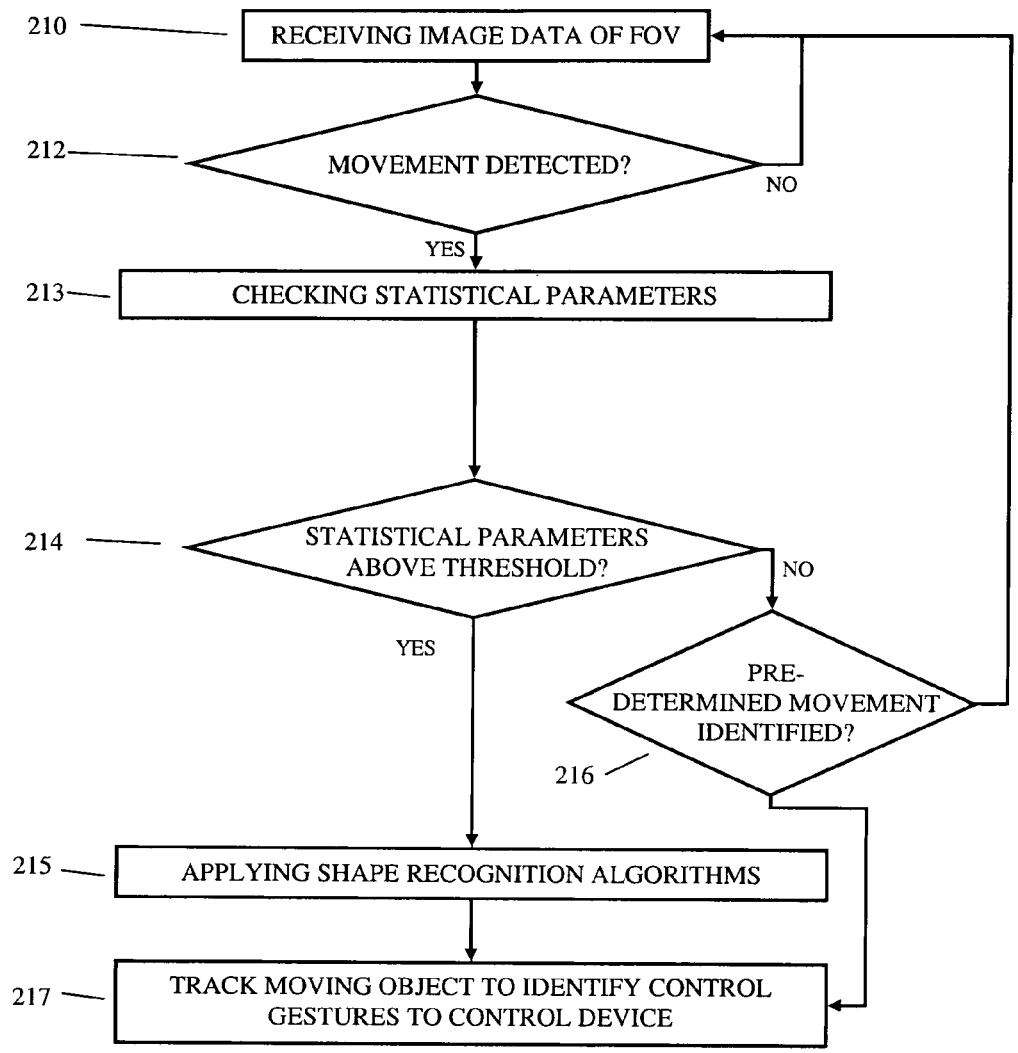
FIG. 2A is a schematic illustration of a method for hand gesture recognition based on statistical parameters of images according to embodiments of the invention.

Reference is now made to FIG. 2A which is a schematic flow diagram illustration of a method for hand gesture recognition based on statistical parameters of images of a FOV, such as FOV 104. According to one embodiment depicted in FIG. 2A a method for user hand identification may be operable even in poor environment conditions when hand shape recognition is not easily possible (e.g., in poor illumination conditions). According to one embodiment the method includes receiving at processor 102 image data of a field of view (FOV) (210). According to some embodiments image data may be received directly from storage device 107 or from a cache memory. The image data is then analyzed, for example by processor 102 or by another processor. Motion detection algorithms may be applied to detect movement. Two consecutive frames may be compared or batches of images (e.g., 5 frames in a batch) may be compared.

If movement of an object within the FOV is detected (212), then statistical parameters of the image data are checked (213). Statistical parameters may include illumination parameters. If the statistical parameters are above a pre-defined threshold (214) (i.e., imaging conditions are good), shape recognition algorithms are applied (215), for example by processor 102, to identify the object as a hand (217). If the statistical parameters are below the predetermined threshold applying shape recognition algorithms may be less practical. Thus, in poor imaging conditions the step of hand shape recognition may include lowering a shape recognition threshold and a user hand is identified based primarily on movement, specifically, if a predefined movement pattern is identified (216), hand identification can be determined (217) even with very low hand shape recognition.

Additional or other methods may be employed to determine hand identification in less than ideal imaging conditions. According to one embodiment image enhancement techniques are applied after detecting movement of the object. The image enhancement techniques may include modifying imager parameters and/or modifying environment lighting conditions. The imager parameters may include at least one of the group consisting of contrast, gain, brightness, frame rate and exposure time parameters.

Figure 2B:
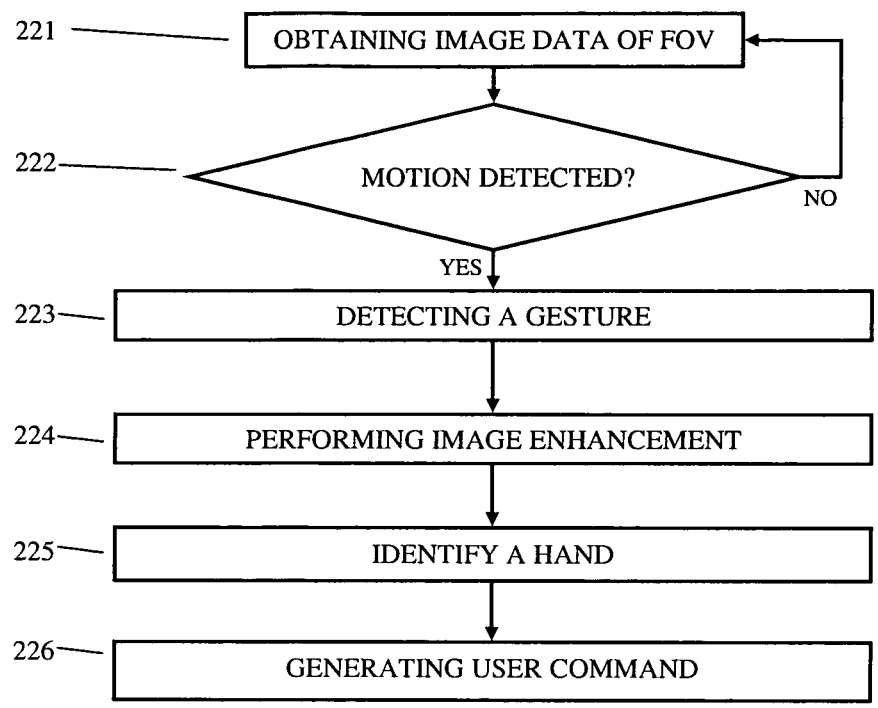
FIG. 2B is a schematic flow-chart depicting a method for user-device interaction including an image enhancement step, according to an embodiment of the invention.

According to another embodiment, schematically illustrated in FIG. 2B, the step of obtaining image data of the FOV (221) is followed by the step of motion detection (222). If motion is detected, a specific pre-defined movement (e.g., gesture) is sought (223). If a gesture is identified a step of applying image enhancement techniques (224) is performed. Following the image enhancement steps an optional step of applying shape recognition algorithms to the image data may be is performed to identify a hand (225). A user command is generated based on the identified gestures or movements (226).

Image enhancement techniques include any suitable step to augment the image data of the object in relation to the background image data. These techniques may include modifications to image sensor parameters or modifications of the environment. Modifications to imager parameters may include increasing gain, contrast, exposure time, decreasing frame rate or zooming in on the identified hand to obtain a more detailed field of view, to enable better differentiation between the object and the background. These parameters or other suitable image enhancement parameters of the imager may be increased to a pre-determined level after which shape recognition algorithms are applied (step 224) or they may be gradually or dynamically increased, each increase depending on whether the pre-determined level was obtained or not.

Modifications to the environment may include changing lighting conditions, for example by activating a dedicated illumination source and/or activating additional imagers or filters on the existing imager to enhance imager sensitivity.

According to embodiments of the invention, environment lighting conditions may be altered to enhance differentiation between the object (preferably, the user's hand) and the background. For example, a user may be watching a movie on a PC or TV or DVD or any other suitable device, in a low illumination environment. If the user wishes to input a user command to the device, while he is watching the movie, he may move his hand in a specific gesture, in the camera FOV. The hand movement may be detected but the illumination conditions may not enable shape recognition of the hand, thus preventing the generation of a user command. To enhance recognition of the hand a light source, such as a white LED or IR LED, may be activated in response to the detection of movement. The added illumination may provide sufficient conditions for shape recognition to occur. Non visible illumination, such as IR illumination, may have the added value of providing illumination to the imager without inconveniencing the user.

According to one embodiment, gesture detection may result in a temporary change of the device screen parameters, such as increase of screen brightness, to provide the required illumination.

According to other embodiments a dedicated image sensor, in addition to the main image sensor (e.g., 103) may be activated in response to gesture detection, for example, an IR range visual sensor may be activated in low illumination conditions, and/or in response to activation of the IR illumination source, to recognize the user's hand. According to additional embodiments a single imager may be used (e.g., 103) and an IR filter can be manually or automatically applied to this imager to switch between visual light sensor and IR sensor.

According to some embodiments, a combination of image enhancement techniques may be applied. Some techniques may be applied initially and others added until a hand shape is recognized or until a predetermined level of enhancement is obtained.

Once a hand is identified the object now identified as a hand may be tracked and hand gestures may be recognized to further generate user commands to control the device 101.

According to some embodiments of the invention identification of a user hand by the system 100 may be enhanced based on information gathered over time or over a number of frames. For example, if an object movement is detected in a specific recurring pattern over a large number of image frames, this may indicate that the object is not randomly moving but rather that the object is moving in a pre-defined pattern.

Figure 3:
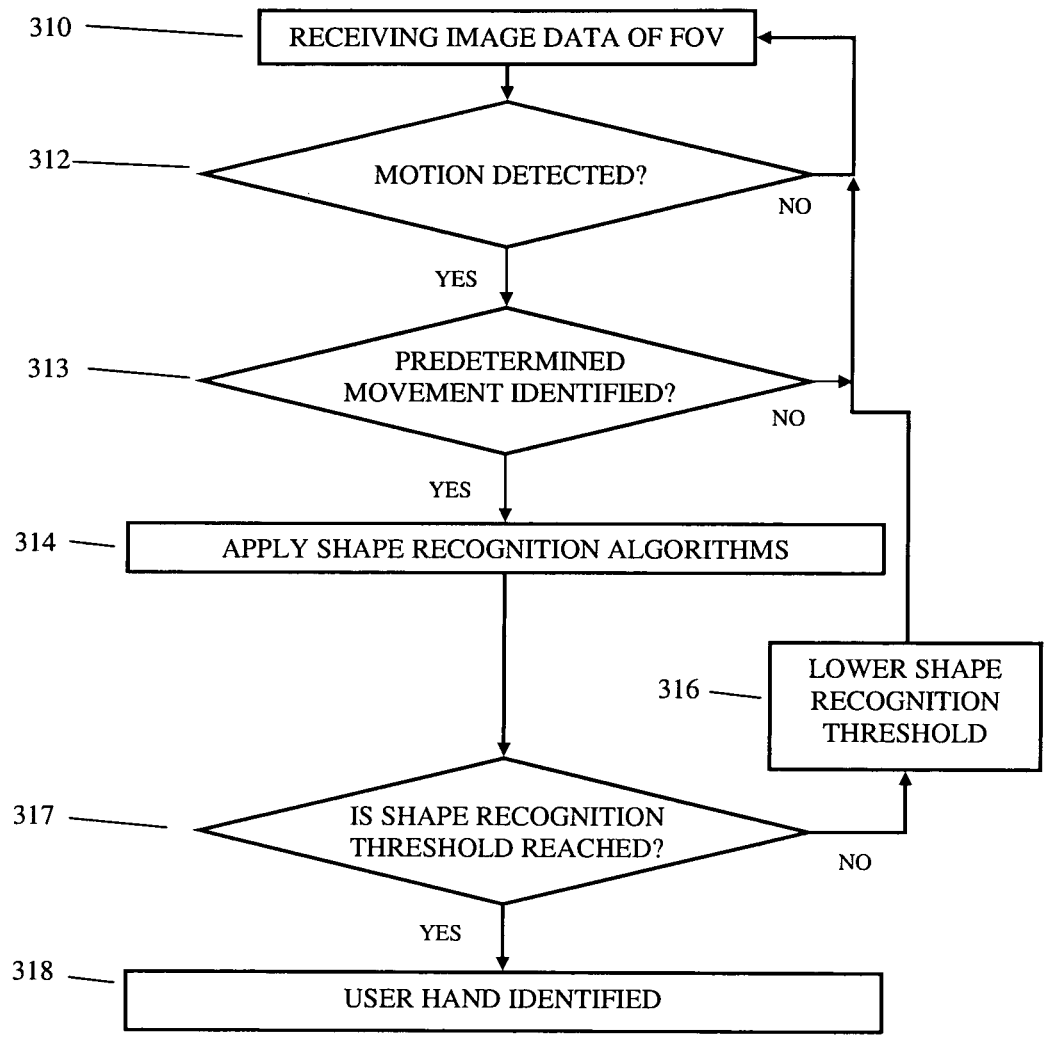
FIG. 3 is a schematic illustration of a method for hand gesture recognition in which the threshold for hand shape identification is adjustable, according to embodiments of the invention.

According to an embodiment schematically illustrated in FIG. 3 the threshold for hand shape identification is adjustable based on additional gathered information.

According to one embodiment image data, for example, data from two consecutive batches of images is received (310), for example, at processor 102, and movement is searched (312). If movement is detected it is compared to a movement in a pre-defined pattern (313) and if the movement detected is in a pre-defined pattern, shape recognition algorithms are applied (314). The results of the shape recognition algorithms are compared to a pre-determined threshold (317), above which hand shape detection is confirmed. If the comparison shows that the results of the shape recognition algorithms did not reach the pre-determined shape confirmation threshold (317) the confirmation threshold is lowered (316). Thus, the confirmation threshold may be lowered the more an object moves in a movement of a pre-determined pattern. Once the confirmation threshold is reached a user hand may be identified (318). Following user hand identification the object identified as a hand may be tracked and control gestures may be identified to control the device 101.

Hand shape confirmation may be achieved by grading detected shape parameters based on their proximity to a hand shape model. A threshold may be set and if the grade is, for example, above a certain percent similarity the threshold may be considered reached.

According to some embodiments of the invention a hand is identified by applying machine learning techniques.

According to one embodiment of the invention a continuous, rather than discrete, grading system has been developed in which features are assigned values which are compared to a threshold and a decision regarding the validity of the feature (in the context of identifying a hand shape) is made based on the proximity of a value to the threshold rather than determining if the value is above or below the threshold.

According to another embodiment deciding if an object is a hand is based on determining the number of frames in which a hand shape is identified. If a hand shape is identified in a certain amount (or percentage) of the frames then it is confirmed that the object is a hand.

Figure 4:
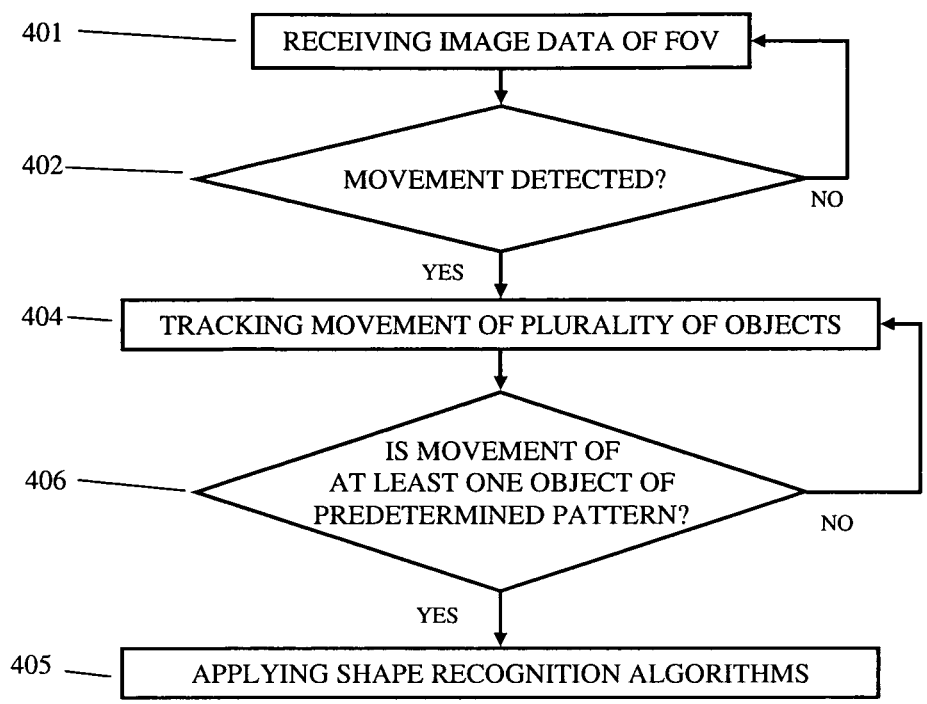
FIG. 4 is a schematic illustration of a method for identifying a hand shape in an environment of a plurality of moving objects, according to an embodiment of the invention.

According to some embodiments of the invention the system 100 may be adapted to easily identifying a hand shape even within an environment of a plurality of moving objects. According to one embodiment, schematically illustrated in FIG. 4, image data is received (401) and movement is detected (402). In the case of several moving objects within the FOV all moving objects are tracked (404) and the movements are compared to a movement of a pre-determined pattern (e.g., a gesture) (406). If the movement of at least one object is the pre-determined movement, hand shape recognition algorithms are applied to the image data (405). According to one embodiment shape recognition algorithms are applied to the object identified as moving in the pre-determined movement. If none of the objects are moving in a pre-determined movement the tracking of step 404 may be continued until a pre-determined movement is found.

Being able to identify a specific shape may be greatly aided by combining information from a plurality of images. According to one embodiment, the combined information can be a function of at least two shape affinity grades from at least two images. For example, averaging shape affinity grades helps to obtain smoother, cleaner shape detection. For example, for a sequence of images an average may be calculated based on grades given to objects identified with shape recognition algorithms or based on their proximity to pre-assigned values or thresholds, as described above. The threshold for shape recognition may be set based on the calculated average, which is basically less sensitive to "noise". Thus, an object whose calculated average shape recognition value(s) is above the threshold will be considered a hand while objects that are under the threshold are discarded. According to some embodiments the step of tracking (404) includes tracking clusters of pixels having similar movement and location characteristics in two, typically consecutive images.

According to some embodiments of the invention methods of reverse optical flow may be used. Optical flow relates to the pattern of apparent motion of objects (or edges) in a visual scene, caused by the relative motion between the observer (e.g., camera) and the scene. Sequences of ordered images and tracking discrete image displacements allow the estimation of motion.

According to some embodiments a method for identifying a gesture includes tracking a point throughout a sequence of ordered images; calculating the reverse displacement of the point (the displacement of a point from frame 2 to frame 1, as opposed to from frame 1 to frame 2); comparing the reverse displacement to a desired displacement and if the comparison is below a pre-determined threshold, discarding the movement.

Figure 5:
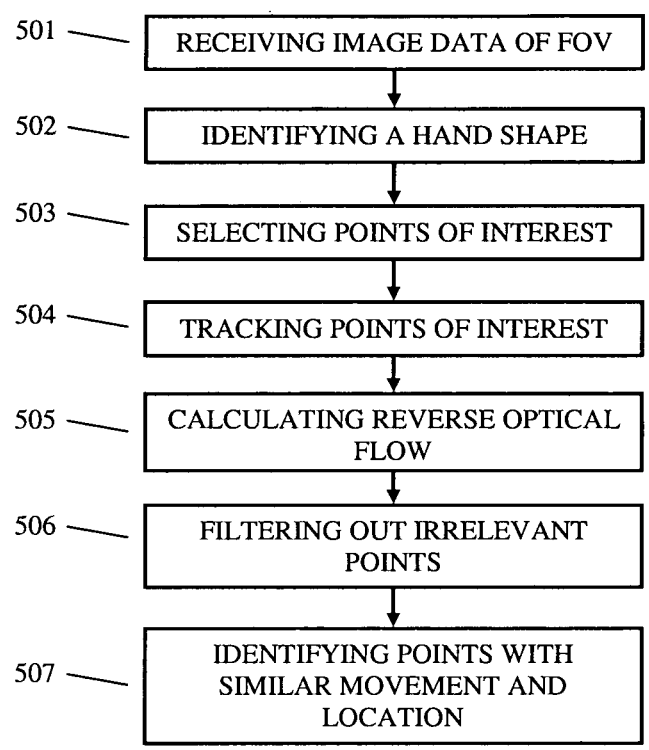
FIG. 5 is a schematic illustration of a method for computer vision based hand gesture identification using symmetrical optical flow formulations, according to embodiments of the invention.

A method for computer vision based hand gesture identification using the reverse optical flow formulations, according to some embodiments, is schematically illustrated in FIG. 5. Image data is received (501). Typically, the image data includes image frames arranged in sequence. A hand shape is detected (502) (for example, by applying a continuous grading algorithm as described above) and points (pixels) of interest are selected (503) from within the detected hand shape area, the selection being based, among other parameters, on variance (points having high variance are usually preferred). Movement of points is determined by tracking the points from frame n to frame n+1 (504). The reverse optical flow of the points is calculated (the theoretical displacement of each point from frame n+1 to frame n) (505) and this calculation is used to filter out irrelevant points (506). A group of points having similar movement and location parameters is defined (507) and these points are tracked for further gesture recognition.

Using reverse optical flow methods according to embodiments of the invention may improve the accuracy of movement detection.

Algorithms as described above may also be used to confirm the sidedness of a hand or if the palm or back of the hand is in view of the image sensor. For example, features of a suspected hand shape may be compared to left and right hand models and/or to palm and back of hand models and graded according to their proximity to the model. The shape getting the highest grade or having the most points with grades above a certain threshold is determined to be the imaged hand (left or right and/or palm or back of hand).

Identification of an object as a left or right hand and/or as palm or back of hand may be employed according to embodiments of the invention, for example in recognizing a gesture. According to some embodiments two hands of a user may be used in a specific gesture, as opposed to a single handed gesture. For example, a gesture of initialization (e.g., to start operation of a specific program) may require two hands of a single user. Another example of a two handed gesture is the use of two hands in gestures which manipulate a user interface such as in zooming a window in/out or in rotating an object on a screen. According to one embodiment, the system determines that a single user is using both hands only when a right hand is located to the right of a left hand (or a left hand located to the left of a right hand). According to some embodiments, additional parameters may be used by the system to determine that a single user is using both hands, for example, only a left and right hand of the same size may be determined to be two hands of the same user and/or only a left and right hand being distanced from each other no more than a pre-defined distance may be determined to be two hand of the same user. Two hands of the same sidedness are not identified as belonging to a single user. According to some embodiments the palm or back of a hand may be used to confirm a gesture. For example, a movement of a hand in a pre-determined pattern may be identified as a specific gesture only if the palm (or back of hand) is facing the image sensor.

According to other embodiments the left hand is used to generate a first user control command and the right hand is used to generate a second user control command. For example, the right hand may generate a media player mode command and the left hand—a presentation mode (e.g. Power-point from Microsoft). According to some embodiments different finger movements can generate different user commands. For example, the thumb may be moved in a defined pattern to generate a user command. The user command may include switching a system to cursor operating mode. According to some embodiments the thumb is moved in a defined pattern to emulate a button or mouse click.

According to some embodiments the method includes returning the cursor to the position it was in prior to the start of the thumb movement.

Figure 6:
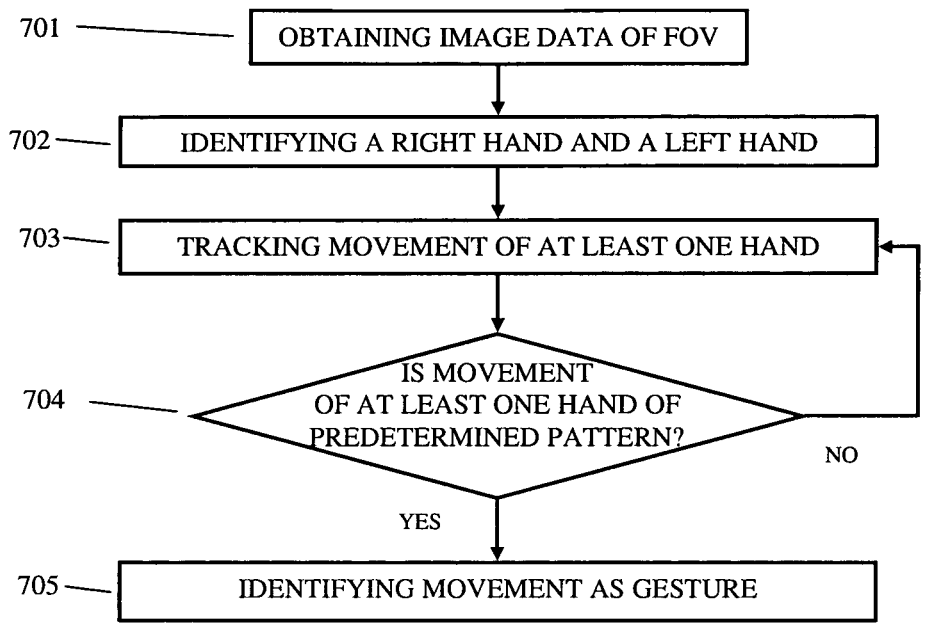
FIG. 6 is a schematic illustration of a method for computer vision based hand gesture identification including the identification of both left and right hand, according to embodiments of the invention.

According to one embodiment, schematically illustrated in FIG. 6, a method for computer vision based hand gesture identification includes receiving image data of a field of view (701) and identifying a right hand and a left hand (702). Right and left hands may be identified by identifying movement and then applying shape recognition algorithms, such as machine learning algorithms. Alternatively, shape recognition algorithms may be applied prior to identification of movement.

Once a left and a right hand are identified the movement of at least one of the hands is tracked (703) and its movement is compared to a pre-defined pattern (704). If the tracked hand movement is in a pre-defined pattern the movement is identified as a gesture (705).

According to some embodiments the size of an object may be the basis for detecting movement. For example, an object may be smaller the farther it is from the image sensor. Thus, relative position of points or group of points determined to be within a hand shape (for example as described with reference to FIG. 5) in consecutive frames can be used as an indication of movement of a user hand along the Z axis. For example, if points are getting closer to each other in consecutive frames, it may be determined that the object is getting smaller, namely, that the object is moving away from imager 103.

Figure 7:
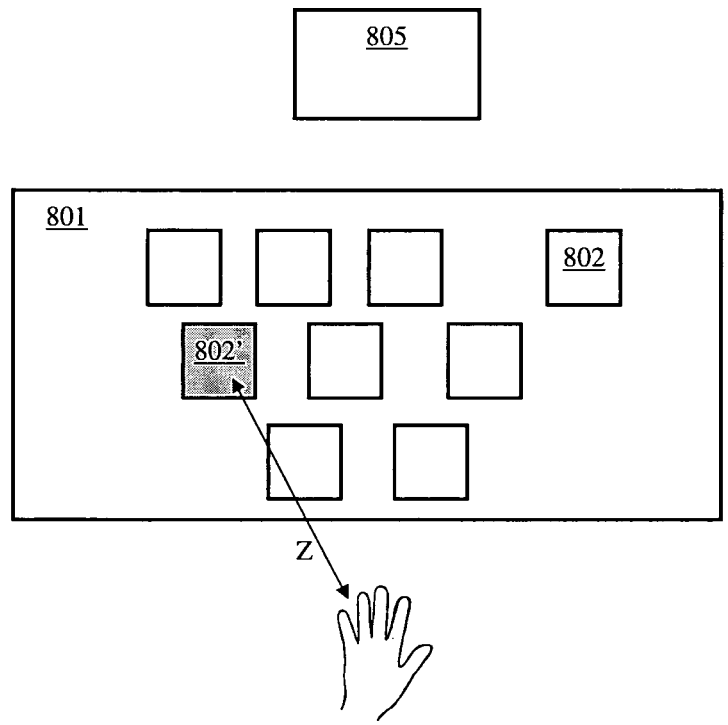
FIG. 7 is a schematic illustration of a system operable according to one embodiment of the invention.

Movement along the Z axis (the axis substantially along a line of sight of image sensor 103 or 805) may be used in gesture or movement pattern recognition. For example, as schematically illustrated in FIG. 7, a screen 801 (or other user interface devices) may display icons 802 or symbols, for example letter keys. A user's hand(s), an image of which is captured by an image sensor 805, may be identified and tracked, for example as described above, and the position of the user's hand may be correlated to a specific icon 802'. This correlation may result in some sort of change in the icon 802' appearance. For example, the icon 802' may become bold or may be illuminated to indicate selection of that icon. The user may choose/activate (e.g., simulate a key pressing action) the icon 802' by moving his hand closer to screen 801 (essentially moving the hand along the Z axis in relation to the image sensor 805).

Figure 8:
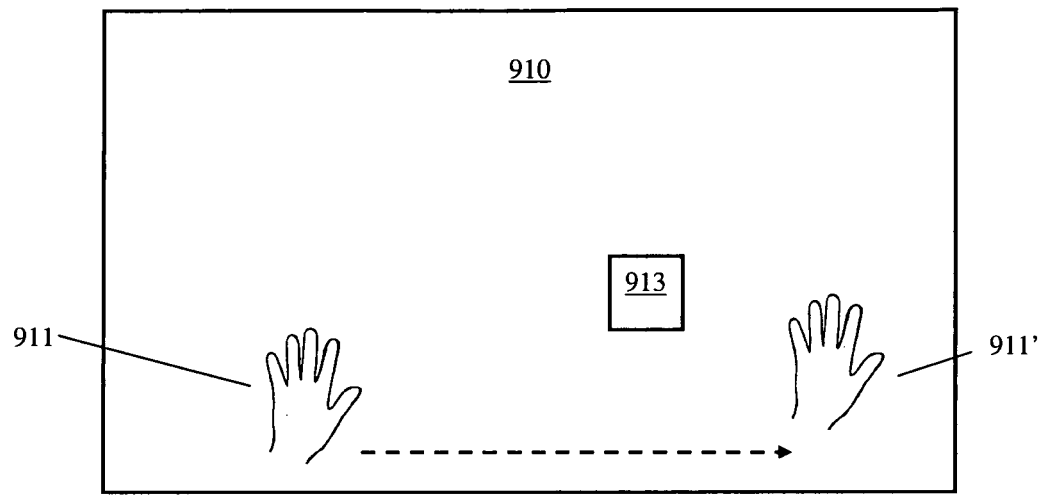
FIG. 8 is a schematic illustration of a system operable according to another embodiment of the invention.

According to one embodiment a user interface may signal to a user when his hand movement has exceeded the limits of the FOV. For example, as schematically illustrated in FIG. 8 a user's hand 911 may be tracked and its position displayed on a screen 910. If the hand is approaching the limit of the image sensor's field of view (not shown) an icon 913 may appear and a picture of a hand may be shown to the right of the icon signaling to the user to move his hand back into the field of view (typically to the left).

Gestures recognized by the system and used to generate user commands to a device typically include hand movements in a specific pattern. According to some embodiments, a special gesture component should be used for indicating the end of a gesture so that the tracking of the hand does not continue after identifying the special gesture component. For example, closing the hand fingers in a fist may signal the end of a gesture. According to some embodiments if a hand motion is identified as a specific pre-defined gesture then a user aid tool is displayed, for example on display 106 (FIG. 1).

Figure 9A:
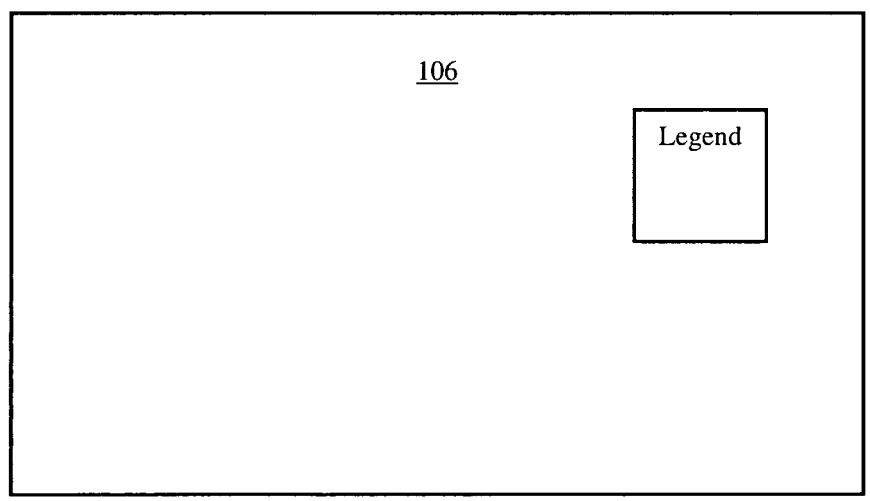
FIGS. 9A-C schematically illustrate user aid tools according to embodiments of the invention.
Figure 9B:
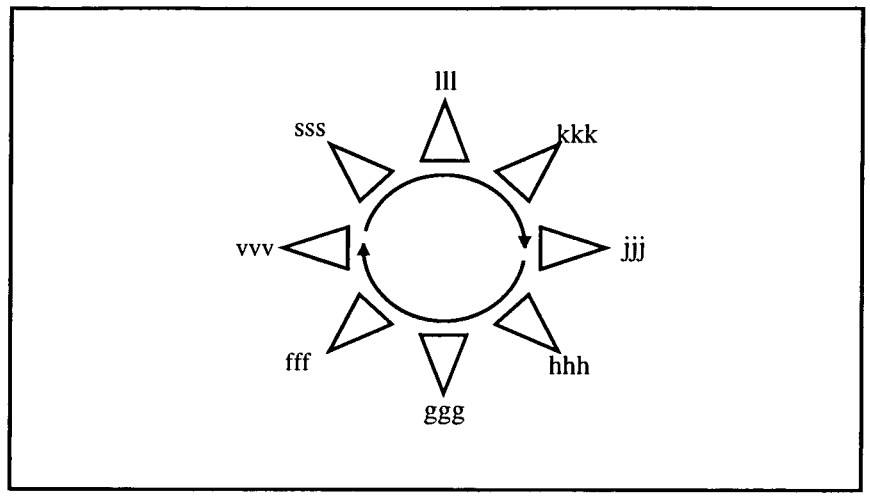
Figure 9C:
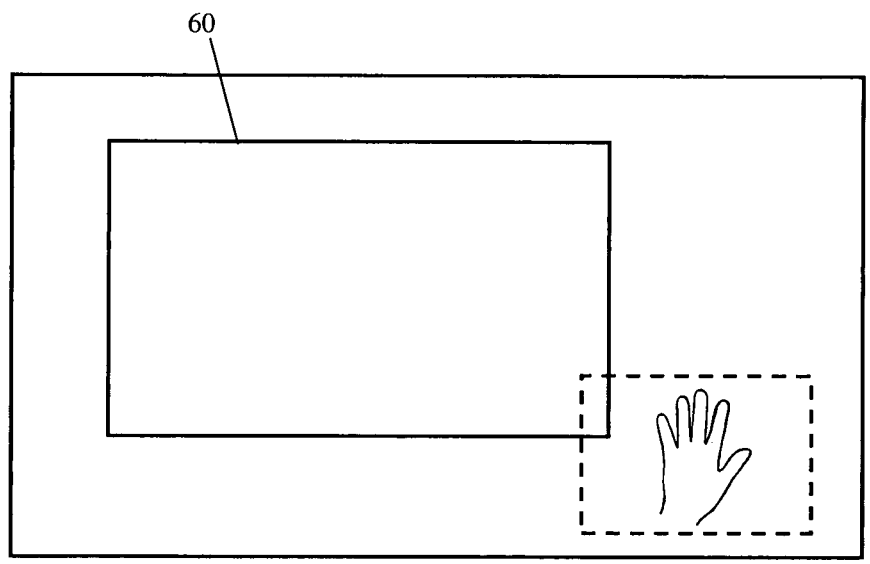

According to one embodiment, for example, as illustrated in FIG. 9 A, the user aid tool is a legend displayed on monitor 106. The legend may graphically or otherwise present the list of hand gestures and their result for user reference. Other legends and menus may be presented. According to one embodiment, the legend may be dynamic and application specific. For example, if a word processing application is being run on a PC, a specific hand gesture may call up a legend relevant to the word processing application.

Another aid tool is schematically illustrated in FIG. 9 B. The user aid tool may be a direction tool which may, for example, include a graphical display appearing on monitor 106, of possible directions in which the user may move his hand and the command activated by each direction.

According to yet another embodiment a user aid tool is provided to ensure continuous, fluent use. According to one embodiment, as schematically illustrated in FIG. 9 C, a video of the tracked hand is displayed on display 106 so that the user may have feedback regarding his hand gestures. The image of the user's hand or a graphic representation of the user's hand may be displayed within a frame 60 which depicts the boundaries of the FOV of the camera, such that the user may be warned if his hand is in the proximity of the FOV boundary. According to some embodiments, another indication to the user may be activated (for example, an audio signal) if the user's hand is approaching the image sensor field of view boundaries, so as to avoid losing track of the hand.

According to one embodiment a raw video or slightly processed video of the user's hand may be presented to the user. According to one embodiment the graphical aid tool is superimposed on the video of the user's hand. According to one embodiment the graphical aid tool shows buttons and the user may move his hand over the graphically displayed buttons to operate the buttons. According to some embodiments a specific area or point may be marked on the image of the hand to indicate the point which may activate the displayed buttons.

The user aid tools according to embodiments of the invention may be displayed to a user in a non-obstructive way, for example, in an unused corner of a device monitor or as a semi transparent display on the device screen.

According to some embodiments user hand gestures may control a displayed object movement, such as cursor movement and operation. According to one embodiment a system includes a forward facing camera and a processor to normalize cursor (or other displayed object) movement in accordance with the size of the user hand relative to the image frame which includes the hand (which is an indication of the distance of the hand from the camera). Thus, cursor (or object) movement may be linked to the actual hand displacement rather than to the hand angular displacement.

According to one embodiment a specific gesture may be used to move from a mode of operating gestures (where the system accepts user commands based on hand gestures) to a mode of cursor operation (where the system is controlled by a user interface device, such as a keyboard). For example, the specific gesture may be a movement of the thumb closer or further away from the base of the hand.

According to some embodiments, while operating in "cursor operating mode", a specific gesture may be used for releasing the cursor control. For example, while moving a cursor on a display using hand movement, the hand may reach the boundaries of the screen. A specific gesture (e.g., folding the fingers into a fist) may allow the user to temporarily disconnect from the cursor, move the hand back into the screen area and resume cursor control.

According to some embodiments, a hand gesture may be used to select and manipulate an object displayed on a screen (e.g., icon). For example, bringing a thumb close to a finger in a "tweezers movement" around the object on the screen may capture the object and movement of the hand may drag the object on the screen in accordance with the hand movement. Movement of the hand may also provide movement of an object on the z axis (e.g., shrinking and enlarging the object) or rotating the hand to rotate the object. Another such gesture may include bringing the tips of all fingers together such that they touch each other or bringing the tips of all fingers close to each other such that they are like holding a valve, the object being the "valve". Another gesture may include closing all the fingers of the hand to a fist shape. Opening the hand may be used to release the object so that hand movements no longer manipulate the object.

According to some embodiments a specific gesture (such as bringing the tips of all fingers close to each other such that they touch each other) may act like touching a touch screen at the location of the cursor. This gesture may be used to emulate a click if the hand returns quickly to its original shape, double click if "clicking" twice, or dragging an object on the screen causing it to follow further movement of the hand whereas movement of the hand without "grabbing" the object will not move it. Thus, gestures using two hands to rotate zoom or otherwise manipulate a window or object on a screen may be active only once a "grab" gesture of at least one of the hands has been performed.

According to some embodiments a method for manipulating an object displayed on a device screen, is provided. According to one embodiment the method includes identifying an initializing gesture; identifying an operating gesture, said operating gesture to select an object; tracking the operating gesture; and moving the object in accordance with the tracked gesture. Thus, according to some embodiments the operating gesture may include bringing a thumb close to a finger in a "tweezers movement", bringing the tips of all fingers closer to each other or together such that they are touching or creating a fist shape.

According to further embodiments of the invention a method for user-device control, includes identifying in an image a first part of the hand and second part of the hand; tracking across a plurality of images the first part of the hand and generate cursor movement control based on the tracking of the first part of the hand; and tracking across the plurality of images the second part of the hand and generating user commands based on the tracking of the second part of the hand. The first part of the hand may include at least the hand base and the second part of the hand may include at least one finger.

According to one embodiment identifying the second part of the hand comprises differentiating between a thumb and other fingers. According to one embodiment the method includes differentiating between a left hand and a right hand based on identification of location of the thumb in relation to other fingers.

By separately tracking the base of the hand from one or more fingers and/or being able to differentiate the thumb from the other parts of the hand, cursor movement control and button click emulation can be provided concurrently with the same hand without interfering with each other. According to one embodiment a button or, for example, mouse left click command is generated by a movement of the thumb in relation to other parts of the hand (e.g., thumb moving towards or away from base of hand or from other fingers). Thus, finger movements and postures can be performed without affecting cursor position and movement. However, in some embodiments, in order to avoid unintentionally moving the cursor with a hand gesture, upon detection of a gesture, the system may automatically return the cursor to its position prior to the beginning of the gesture.

According to some embodiments the method includes normalizing cursor sensitivity to the size of the hand in the image.

Embodiments of the invention further present a computer vision based remote control unit. According to embodiments of the invention a computer vision based remote control unit is provided which includes a processor and an interface to connect to a device with a graphical screen, said processor to: receive images of a field of view; detect a user hand from the images; track the user hand to identify a control gesture; generate a remote control command based on the identified control gesture; and transmit the command to a remote device; and display on the device graphical information relating to remote device control options.

The remote control unit may include an IR LED wherein the transmission of the command to the remote device is by using the IR LED. Typically, the transmission uses standard transmission protocol of remote control.

According to some embodiments the remote device is a TV, STB or a DVD player.

According to some embodiments the processor is to choose a remote device based on the identified control gesture and the processor is to display graphical information specific to the chosen remote device. The graphical information may include application specific user interface information.

Figure 10:
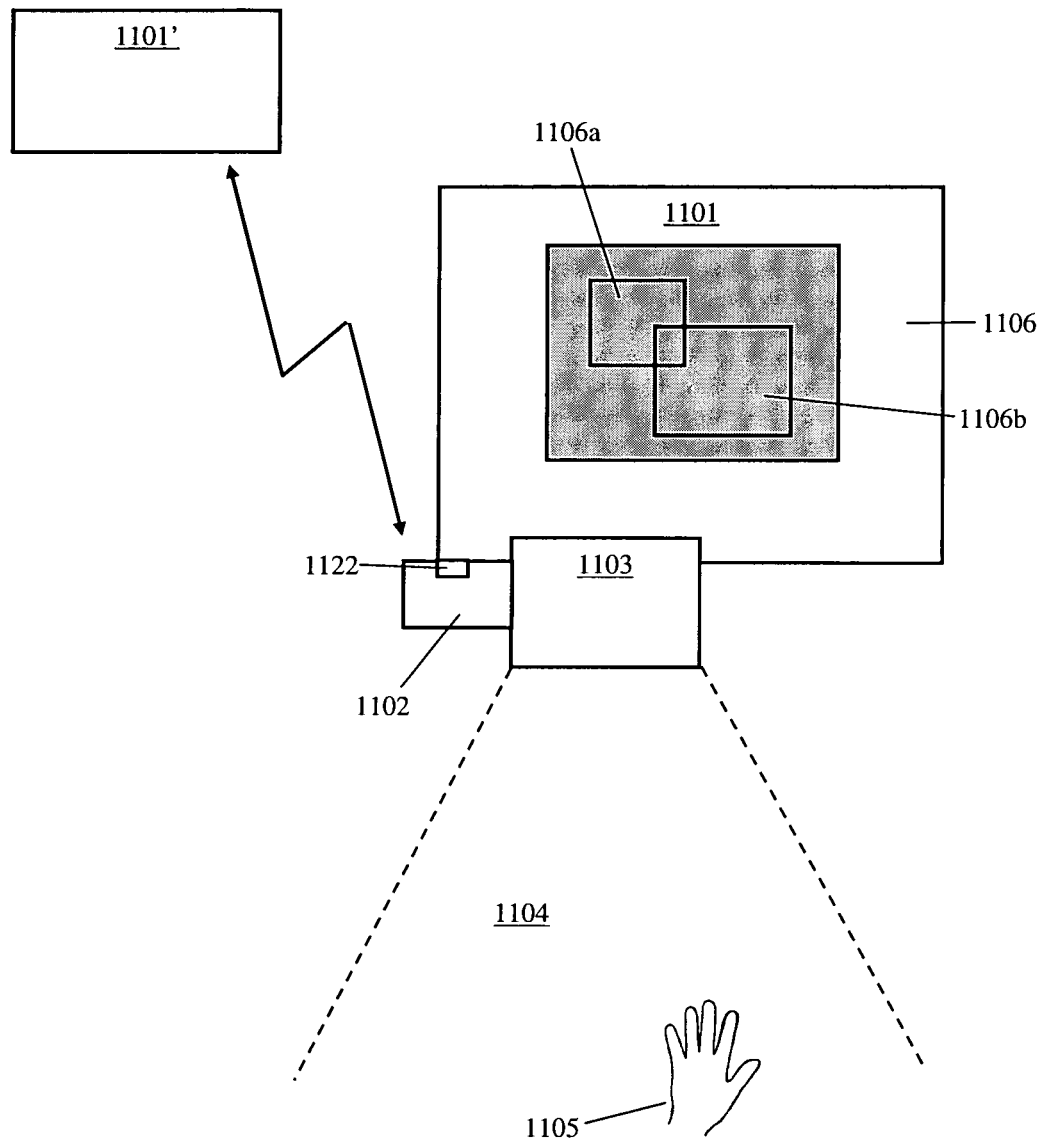
FIG. 10 is a schematic illustration of a remote control unit operable according to embodiments of the invention.

A schematic illustration of a remote control unit operable according to embodiments of the invention is presented in FIG. 10. A system operable according to embodiments of the invention may include a processor 1102 which is in communication with an image sensor such as camera 1103 and with a user interface device 1106 and a remotely controlled device 1101.

The camera 1103 obtains images of a field of view (FOV) 1104 which includes a user's hand 1105. The processor 1102 detects a user hand (for example, as described above) and generates a remote control command based on the hand gesture. The remote control command is transmitted to device 1101 (which may be for example a TV, STB, DVD player, etc.). The device 1101 may include a graphic interface 1106, such as a monitor or screen. The remote control unit may include an IR LED (not shown) wherein the transmission of the command to the device is by using the IR LED. The transmission typically uses standard transmission protocol of remote control.

According to some embodiments the remote control unit may include a connector 1122 to connect to electronic device 1101 and may be in wireless communication with another electronic device 1101'. Graphic information relating to the control of device 1101 as well as device 1101' may be displayed on graphic interface 1106.

The connector 1122 to may be any suitable wired or wireless connection, such as a USB connection.

According to some embodiments graphical information may be displayed on the graphic interface 1106, such that commands may be transmitted wirelessly to remote devices while graphical information is available to the user. The graphical information, which is typically displayed based on detected user hand gestures, may relate to remote device control options, e.g., a menu showing all the accessible remote devices (e.g., 1101 and 1101') may be displayed so that a user may choose, typically with hand gestures, a remote device he wishes to operate. Other windows showing additional control options may be displayed to the user. For example, each device 1101 and 1101' may have different control windows 1106a and 1106b, both displayed on a single graphic interface, such as 1106. Each window 1106a and 1106b may have a different control interface. For example, device 1101 may be a TV and device 1101' may be a DVD player or a STB. According to one embodiment the TV may be connected by USB to a camera and processor unit and a STB or other device is wirelessly connected to the processor unit. According to other embodiments both connections may be wireless or the connection to the TV may be wireless while the connection to the other device may be through a USB or other electric connector.

According to one embodiment windows 1106a and 1106b are both displayed on the TV display but while window 1106a shows TV control commands (such as volume, change channels, etc.), window 1106b shows commands for playing a DVD (such as stop, rewind, play) or commands to operate a STB.

Once a specific device is chosen by the user the device or application specific window may be displayed on top of the other windows, which may be faded out while the chosen device window is bold.

Each device may have a different user aid tool displayed in different windows. A user aid tool may be, for example, a legend graphically or otherwise presenting the list of hand gestures and their result for user reference. The legend may be application and/or device specific.

This remote control unit according to embodiments of the invention enables control of multiple devices without the user having to move from device to device. A user standing in one place may activate and control several devices at once.

The invention claimed is:

1. A method for computer vision based hand gesture device control, the method comprising
   receiving a sequence of images of a field of view, said images comprising at least one object;
   detecting movement of the at least one object in the images, to define at least one moving object;
   applying a shape recognition algorithm on the at least one moving object in each of at least two of the sequence of images, to obtain shape information;
   performing a first stage determination that the at least one moving object is a user hand by determining that the movement of the at least one object is a movement in a predefined pattern;
   performing a second stage determination that the at least one moving object is a user hand by combining the shape information from each of the at least two of the sequence of images to obtain a combined shape information, and determining that the combined shape information corresponds to a hand shape; and
   subject to successful first and second stage determination, tracking the user hand to control the device.

2. The method according to claim 1 comprising tracking the user hand to identify at least one control gesture.

3. The method according to claim 1, wherein the combined shape information comprises a shape affinity grade associated with said object in each image.

4. The method according to claim 3 wherein the combined shape information is a function of at least two shape affinity grades from at least two images.

5. The method according to claims 4 wherein combining information from at least two images of the object comprises calculating an average of the shape affinity grades from at least two images.

6. The method according to claim 5 comprising comparing the average to a predetermined threshold and deeming the second stage determination positive if the average is above the threshold.

7. The method according to claim 1 comprising:
   determining a shape recognition threshold;
   following the determination in the first stage that the movement of the at least one object is a movement in a predefined pattern, lowering the shape recognition threshold, such that the longer the movement is in a predefined pattern, the lower the shape recognition threshold is.

8. The method according to claim 2 wherein the movement in predefined pattern is an initializing gesture and wherein the initializing gesture and the at least one control gesture are not the same.

9. The method according to claim 8 wherein the initializing gesture is a wave-like movement of the hand.

10. The method according to claim 2 wherein the at least one control gesture is to switch a system to cursor control mode.

11. The method according to claim 1 wherein the combined shape information corresponds to a hand shape only if it is a hand with extended fingers.

12. The method according to claim 1 comprising:
   receiving images of a field of view;
   tracking the movement of more than one object in the images; and
   comparing the movement of at least one of the objects to a predefined movement pattern; and
   if at least one object is moving in a predefined movement pattern, applying shape recognition algorithms to confirm a shape of a hand.

13. The method according to claim 1 wherein tracking comprises selecting points of interest within one image in the sequence of images, detecting the location of the point in another image and identifying points with similar movement and location parameters.

14. The method according to claim 1 comprising applying an edge detection algorithm to confirm the object is a user hand.

15. The method according to claim 1 comprising deriving 3D information from the received sequence of images and combining the 3D information with the information combined from at least two images.

16. A system for user-device interaction, the system comprising:
   an electronic device, an image sensor and a processor, the processor to:
      receive a sequence of images of a field of view;
      detect a movement of at least one moving object in the images, to define at least one moving object;
      apply a shape recognition algorithm on the at least one moving object in each of at least two of the sequence of images, to obtain shape information;

perform a first stage determination that the at least one moving object is a user hand by determining that the movement of the at least one object is a movement in a predefined pattern;

perform a confirmatory second stage determination that the at least one moving object is a user hand by combining the shape information from each of the at least two of the sequence of images to obtain a combined shape information dataset, and comparing the shape information dataset against a reference hand shape information dataset; and subject to successful first and second stage determination, track the object to control the device.

17. The system according to claim 16 wherein the processor is to track the object to identify at least one control gesture and to generate a command to the device based on the at least one control gesture.

18. The system according to claim 16 wherein the image sensor is a 3D image sensor.

19. The system according to claim 16 comprising one or more 2D image sensors.

\* \* \* \* \*